United States Patent
Cai et al.

(10) Patent No.: US 10,763,941 B2
(45) Date of Patent: Sep. 1, 2020

(54) METHOD AND APPARATUS FOR LINE-OF-SIGHT ANTENNA ARRAY

(71) Applicant: HUAWEI TECHNOLOGIES CO., LTD., Shenzhen, Guangdong (CN)

(72) Inventors: Tao Cai, Kista (SE); Majid Nasiri Khormuji, Kista (SE); Henrik Lundqvist, Kista (SE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 14 days.

(21) Appl. No.: 16/162,297

(22) Filed: Oct. 16, 2018

(65) Prior Publication Data

US 2019/0052336 A1   Feb. 14, 2019

Related U.S. Application Data

(63) Continuation of application No. PCT/EP2016/059575, filed on Apr. 29, 2016.

(51) Int. Cl.
*H04B 7/06* (2006.01)
*H04B 7/0413* (2017.01)

(52) U.S. Cl.
CPC ......... *H04B 7/0689* (2013.01); *H04B 7/0413* (2013.01); *H04B 7/0691* (2013.01)

(58) Field of Classification Search
CPC ... H04B 7/0689; H04B 7/0413; H04B 7/0691
See application file for complete search history.

(56) References Cited

U.S. PATENT DOCUMENTS

| | | | |
|---|---|---|---|
| 7,574,236 B1 | 8/2009 | Mansour | |
| 7,948,444 B2 | 5/2011 | Signell et al. | |
| 8,295,382 B2 | 10/2012 | Xu et al. | |
| 2008/0158056 A1* | 7/2008 | Shima | G01S 7/034 342/377 |
| 2011/0012798 A1* | 1/2011 | Triolo | H01Q 3/24 343/713 |

(Continued)

FOREIGN PATENT DOCUMENTS

| | | |
|---|---|---|
| CN | 103181097 A | 6/2013 |
| CN | 105409134 A | 3/2016 |
| EP | 2959609 B1 | 6/2018 |

OTHER PUBLICATIONS

Bohagen et al, "Design of Optimal High-Rank Line-of-Sight MIMO Channels", IEEE Transactions on Wireless Communications, vol. 6, No. 4, Apr. 2007, 6 pages.

*Primary Examiner* — Brian D Nguyen
(74) *Attorney, Agent, or Firm* — Womble Bond Dickinson (US) LLP

(57) ABSTRACT

A network node includes an antenna array having a plurality of antenna sub-arrays. A switching device is coupled to the antenna array, the switching device being configured to connect at least two input signals to respective ones of the plurality of antenna sub-arrays. A processor is configured to determine a channel capacity, wherein based on the channel capacity, the processor is configured to control the switching device to switch a connection of the at least two input signals to different ones of the plurality of antenna sub-arrays to change one or more of an inter-distance between the respective ones of the plurality of antenna sub-arrays and a down-tilting angle of the antenna array.

12 Claims, 8 Drawing Sheets

(56) References Cited

U.S. PATENT DOCUMENTS

| | | | |
|---|---|---|---|
| 2011/0207416 A1* | 8/2011 | Doi | H01Q 1/246 |
| | | | 455/69 |
| 2012/0212365 A1* | 8/2012 | Feil | G01S 13/42 |
| | | | 342/107 |
| 2012/0275531 A1 | 11/2012 | Wu et al. | |
| 2015/0056932 A1* | 2/2015 | Doi | H01Q 1/246 |
| | | | 455/69 |
| 2015/0207551 A1* | 7/2015 | Kang | H04B 7/0608 |
| | | | 375/296 |
| 2018/0278298 A1* | 9/2018 | Takano | H04B 7/0639 |

* cited by examiner

METHOD AND APPARATUS FOR LINE-OF-SIGHT ANTENNA ARRAY

CROSS-REFERENCE TO RELATED APPLICATIONS

This application is a continuation of International Application No. PCT/EP2016/059575, filed on Apr. 29, 2016, the disclosures of the aforementioned application is hereby incorporated by reference in their entireties.

TECHNICAL FIELD

The embodiments of the present disclosure relate generally to wireless communication systems and in particular to dynamic switching of input signals to antenna sub-arrays.

BACKGROUND

In the context of next generation wireless networks, with a targeted commercialization time around year 2020, millimetre wave radio is considered for establishing two types of backhaul nodes, aggregation and non-aggregation backhaul nodes. Millimetre wave is the radio wave with wavelengths between approximately 1 mm and 10 mm, corresponding to frequencies from about 30 GHz to 300 GHz. Due to the large available spectrum bands, millimetre wave is preferable for carrying high bit rate data on the backhaul link. However, spectrum bands other than bands between 30 GHz and 300 GHz can also be used for the backhaul link.

One way to boost the channel capacity of the millimeter wave based backhaul link is to use Multiple-Input-Multiple-Output (MIMO) configurations, and very often LoS MIMO, for the transmitter and receiver of the backhaul link. Typical LoS MIMO systems use Uniform Linear Arrays (ULAs) for the transmitter and receiver.

In a typical ULA system, the transmitter and the receiver antenna comprise multiple antenna sub-arrays. One exemplary ULA system might include four antenna sub-arrays, where each sub-array has sixteen antenna elements. The antenna sub-arrays use multiple antenna elements to form narrow beams.

It is generally understood that the LoS MIMO channel capacity is at a maximum when the condition defined by the equation $$D_t D_r = \frac{\lambda R}{V \cos\theta_t \theta_r}$$

is satisfied, where $\lambda$ is the carrier wavelength; $V=\max(M,N)$ and $M,N$ are the number of sub-arrays at the transmitter and receiver, respectively. The parameter R is used herein to denote the range or distance between the transmitter and the receiver. A distance between different antenna sub-arrays, the inter-distance between antenna sub-arrays, is denoted as $D_t$ and $D_r$, respectively for the transmitter and receiver. The down tilting angles are denoted as $\theta_t$ and $\theta_r$, for the transmit antenna and receive antenna, respectively. The link capacity is related to the down tilting angles $\theta_t$ and $\theta_r$. Azimuth angle has negligible impact on the channel capacity for this case.

The above channel capacity maximization condition is applicable for three-dimensional (i.e. realistic) antenna deployment as well as two-dimensional deployment. Additionally, transmitter antenna configuration parameters, including inter-distance between antenna sub-arrays and down tilting angle, have the same effect on the channel capacity as receiver antenna configuration parameters. Similar methods of controlling transmitter antenna configuration parameters can be applied to control receiver antenna configuration parameters to achieve equivalent channel capacity.

The problem with the ULA system is that the antenna sub-array configuration, i.e. the antenna sub-arrays inter-distances $D_t$ and $D_r$, and down tilt angles $\theta_t$ and $\theta_r$, is fixed and cannot be changed during the operation of the network. Thus, it can be difficult to achieve maximum or optimal channel capacity under certain conditions.

Accordingly, it would be desirable to provide a system for modifying the antenna sub-array configuration at a network node that addresses at least some of the problems identified above.

SUMMARY

It is an object of the present invention to dynamically configure antenna sub-arrays of antenna array at a network node in order to optimize channel capacity. This object is solved by the subject matter of the independent claims. Further advantageous modifications can be found in the dependent claims.

According to a first aspect of the present invention the above and further objects and advantages are obtained by a network node. The network node comprises an antenna array having a plurality of antenna sub-arrays. A switching unit is coupled to the antenna array, the switching unit being configured to connect at least two input signals to respective ones of the plurality of antenna sub-arrays. A processor is configured to determine a channel capacity, wherein based on the channel capacity, the processor is configured to control the switching unit to switch a connection of the at least two input signals to different ones of the plurality of antenna sub-arrays to change one or more of an inter-distance between the respective ones of the plurality of antenna sub-arrays and a down-tilting angle of the antenna array. The aspects of the disclosed embodiments modify the connection between the input signal and the antenna sub-arrays to optimize the channel capacity.

In one embodiment, the processor is configured to determine the channel capacity between the network node and another network node, and use the channel capacity to control the switching unit to switch the connecting of the at least two inputs unit to the different ones of the plurality of antenna sub-arrays. The determined channel capacity can be used to determine an antenna configuration mode corresponding to a desired or optimal channel capacity.

In one embodiment, the processor is configured to determine the channel capacity based on one or more of a SNR, a SINR, a rank of the channel or a range between the network node and the another network node or a carrier frequency. The aspects of the disclosed embodiments provide for determining channel capacity using indirect measurements of channel capacity.

In one embodiment, the processor is configured to receive a desired channel capacity of the antenna array, compare the determined channel capacity of an antenna configuration mode with the desired channel capacity of the antenna array, select an antenna configuration mode whose determined channel capacity is larger than the desired channel capacity, and wherein the switching unit is configured to switch the connection of the at least two input signals to the different ones of the plurality of antenna sub-arrays corresponding to the selected antenna configuration mode. The aspects of the disclosed embodiment enable switching the connection of the input signals to different antenna sub-arrays corresponding to an antenna configuration mode that provides a desired or optimal channel capacity.

In one embodiment, the selected antenna configuration mode provides a maximum channel capacity for a given set of one or more of a SNR, SINR, a rank of the channel or a range between the network node and the another network node or a carrier frequency. The aspects of the disclosed embodiments enable switching to an antenna configuration mode that provides an optimal channel capacity.

In one embodiment, the processor is configured to determine the desired channel capacity by measuring a distance between the network node and the other network node and decide the antenna configuration mode. The aspects of the disclosed embodiments enable switching to an antenna configuration mode that provides an optimal channel capacity for a given distance between the transmitter and receiver.

In one embodiment, the network node comprises one or more of an access node, a backhaul node, an aggregation node, a relay node or a controlling node. The aspects of the disclosed embodiments can be implemented in different network configurations.

In one embodiment, the processor is configured to signal the switching unit to switch the connection of the at least two inputs to different ones of the plurality of antenna sub-arrays using a quantized bit mapping, wherein each quantized bit mapping represents a different antenna configuration mode. The aspects of the disclosed embodiments enable controlling the feedback bits used depending upon how close the peak channel capacity it is desired for the system to operate.

In one embodiment, an antenna configuration mode comprises a connection of at least one first input to at least one of the plurality of antenna sub-arrays and a coupling of at least one second input to at least one other one of the plurality of antenna sub-arrays. The aspects of the disclosed embodiments enable switching a connection of the inputs signals to the antenna array to different ones of the antenna sub-arrays.

In one embodiment, each of the plurality of antenna sub-arrays comprises a plurality of antenna elements, and the processor is configured to cause the switching unit to connect the at least two input signals to a respective ones of the plurality of antenna elements. The aspects of the disclosed embodiments enable processor-based switching of the input signals to different ones of the antenna elements.

In one embodiment, the processor is configured to connect the at least two input signal to the respective ones of the plurality of antenna elements to change an inter-distance of one antenna element relative to another antenna element in an antenna sub-array. The aspects of the disclosed embodiments enable switching the connection of the input signals to antenna elements that are different distances apart and change the inter-distance parameter.

In one embodiment, the processor is configured to signal the switching unit to connect the at least two input signals to an at least one antenna element of the plurality of antenna elements to form at least one antenna sub-array. The aspects of the disclosed embodiments enable adjusting the intra antenna sub-array constellation as well as the inter antenna sub-array constellation.

In one embodiment, the processor is configured to select the at least one of the individual ones of the plurality of antenna elements to form the antenna configuration mode corresponding to the desired channel capacity. The aspects of the disclosed embodiments enable switching the connections between the input signals and individual ones of the antenna elements to form specific beam patterns.

In one embodiment, the processor is configured to signal the switching unit to connect the at least two input signals to the at least one antenna element of the plurality of antenna elements to form a different antenna sub-array within the plurality of antenna sub-arrays based on the desired channel capacity between the network node and the another network node. The aspects of the disclosed embodiments enable switching the connections between the input signals and individual ones of the antenna elements to change the channel capacity.

According to a second aspect of the present invention, the above and further objects and advantages are obtained by a method that includes determining a channel capacity, and controlling a switching unit to switch a connection of at least two input signals to different ones of a plurality of antenna sub-arrays of an antenna array based on the determined channel capacity to change one or more of an inter-distance between respective ones of the plurality of antenna sub-arrays and a down-tilting angle of the antenna array. The aspects of the disclosed embodiments modify the connection between the input signal and the antenna sub-arrays to optimize the channel capacity.

In one embodiment, determining the channel capacity comprises determining the channel capacity between a network node and another network node and using the determined channel capacity to control the switching unit to switch the connection of the at least two inputs to different ones of the plurality of antenna sub-arrays. The determined channel capacity can be used to switch to an antenna configuration mode corresponding to a desired or optimal channel capacity.

In one embodiment, the method includes determining the channel capacity based on one or more of a SNR, a SINR, a rank of the channel or a range between the network node and the another network node, or a carrier frequency. The aspects of the disclosed embodiments provide for determining channel capacity using indirect measurements of channel capacity.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following, the invention will be explained in more detail with reference to the example embodiments shown in the drawings, in which.

DETAILED DESCRIPTION OF THE DISCLOSED EMBODIMENTS

Figure 1:
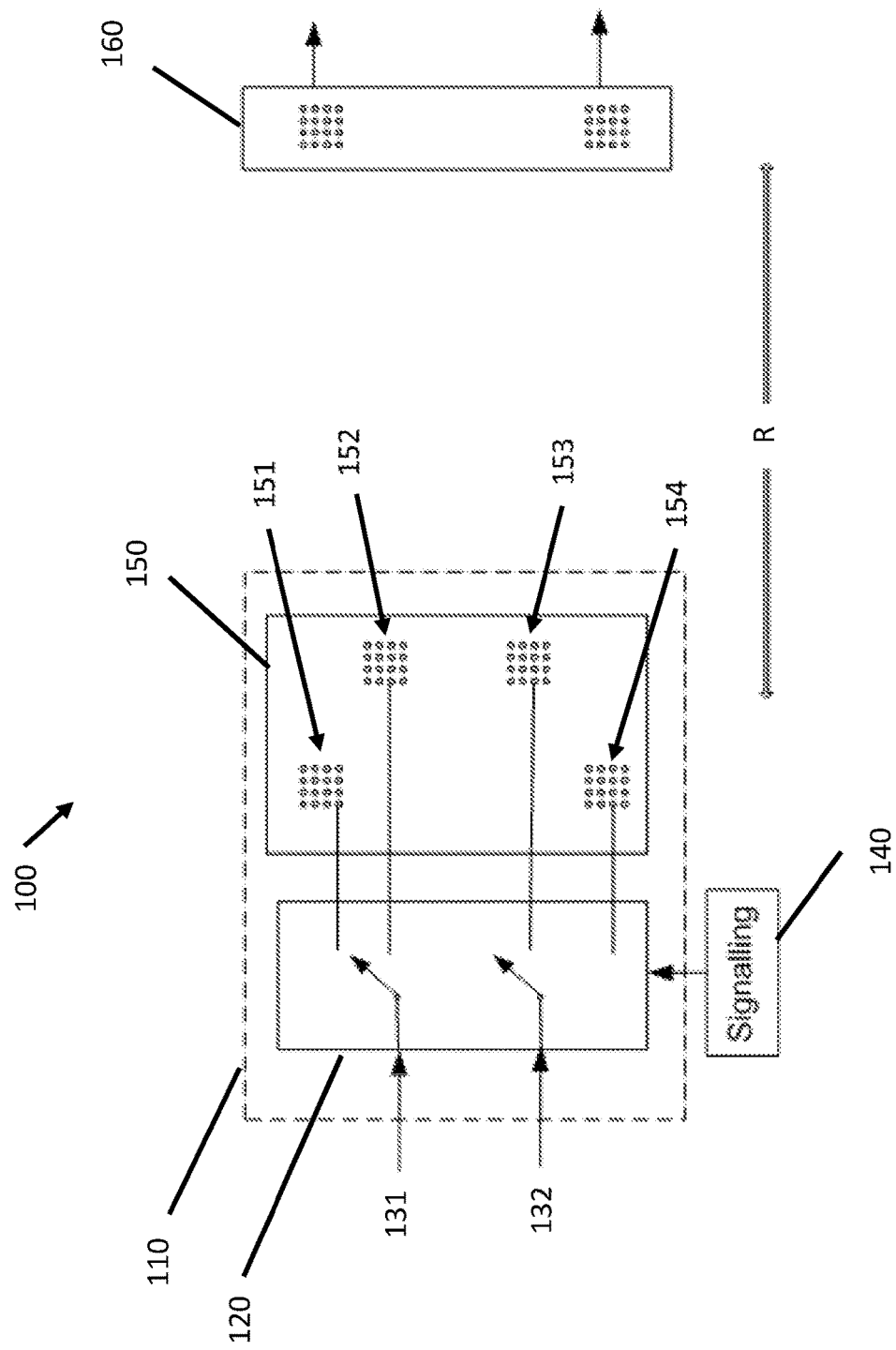
FIG. 1 is a block diagram of a system incorporating aspects of the disclosed embodiments.

Referring to FIG. 1, the aspects of the disclosed embodiments are directed to dynamically configuring and/or reconfiguring a connection between one or more input signals to and different ones of an antenna sub-array or individual antenna elements of a network node. Rather than fixing a configuration of an antenna array, where the configuration generally comprises an inter-distance between different antenna sub-arrays and a down-tilt angle of the antenna array, the aspects of the disclosed embodiments dynamically change the connection between input signals to the antenna array to different ones of the antenna sub-arrays and/or antenna elements. The configuration change, also referred to herein as a mode or configuration mode, is configured to achieve close-to-optimal channel capacity between a transmitter and a receiver in a Line-of-Sight (LOS) MIMO system. The dynamic change and reconfiguration can be controlled through signaling from a network node.

FIG. 1 illustrates one example of a communication system 100 incorporating aspects of the disclosed embodiments. In this example, the communication system 100 includes at least a first network node 110 and at least a second network node 160. As will generally be understood, each of the at least one first network node 110 and at least one second network node 160 can include one or more of a transmitter and a receiver.

The first network node 110 and the second network node 160 are configured to communicate with each other. In one embodiment the first network node 110 and the second network node 160 can be one or more of an access node, a backhaul node, an aggregation node, a relay node or a controlling node.

In the example of FIG. 1, the first network node 110 includes a switching unit 120 and an antenna array 150. The antenna array 150 includes a plurality of antenna sub-arrays, generally referred to herein as antenna sub-arrays 151-154. Although only four antenna sub-arrays 151-154 are shown in FIG. 1, in alternate embodiments the antenna array 150 can include any suitable number of antenna sub-arrays other than including four.

The switching unit 120 is configured to connect one or more of the input signals 131, 132, also referred to herein as data stream inputs, to different ones of the antenna sub-arrays 151-154. The input signals 131, 132 can then be transmitted from the first network node 110 to the second network node 160. Although only two input signals 131, 132 are shown in the example of FIG. 1, in alternate embodiments, the number of input signals can comprise any suitable number of input signals other than including two.

In one embodiment, the switching unit 120 generally comprises a switch. The switching unit 120 is generally an electronic switch, such as a processor controlled telephone switch or telephone exchange. The switching unit 120 is configured to be controlled by a controller or processor 140, as will be described below, to control the connection of the input signals 131, 132 to the antenna array 150.

As is shown in FIG. 1, the antenna array 150 generally comprises a plurality of antenna sub-arrays 151-154. As the term is generally used herein, the term "antenna sub-array" generally describes a group of antenna elements. One antenna sub-array will produce one transmission beam. In the example of FIG. 1, there are four antenna sub-arrays shown, where each antenna sub-array includes sixteen antenna elements. In alternate embodiments, the antenna array 150 can include any suitable number of antenna sub-arrays with any suitable number of antenna elements. Although the antenna sub-arrays 151-154 shown in FIG. 1 are substantially square or rectangular in form and shape, the aspects of the disclosed embodiment are not so limited. The aspects of the disclosed embodiments can be applied to various types of antenna arrays and antenna sub-arrays, including cylindrically shaped antenna arrays.

In the example of FIG. 1, a controller 140 is connected to the switching unit 120. The controller 140, also referred to as a processor, is configured to provide signaling to the switching unit 120 to control the switching and connection of the data streams or input signals 131, 132 to individual ones of the plurality of antenna sub-arrays 151-154. In one embodiment, the signaling is in the form of feedback bits or control signaling information bits, as will be further described herein.

In one embodiment, the controller 140 is configured to select an antenna configuration mode from a plurality of antenna configuration modes, where each antenna configuration mode is configured to optimize channel capacity for a given set of conditions between the first network node 110 and the second network node 160. The number of possible antenna configuration modes is generally dependent upon the number of antenna sub-arrays 151-154.

Figure 2:
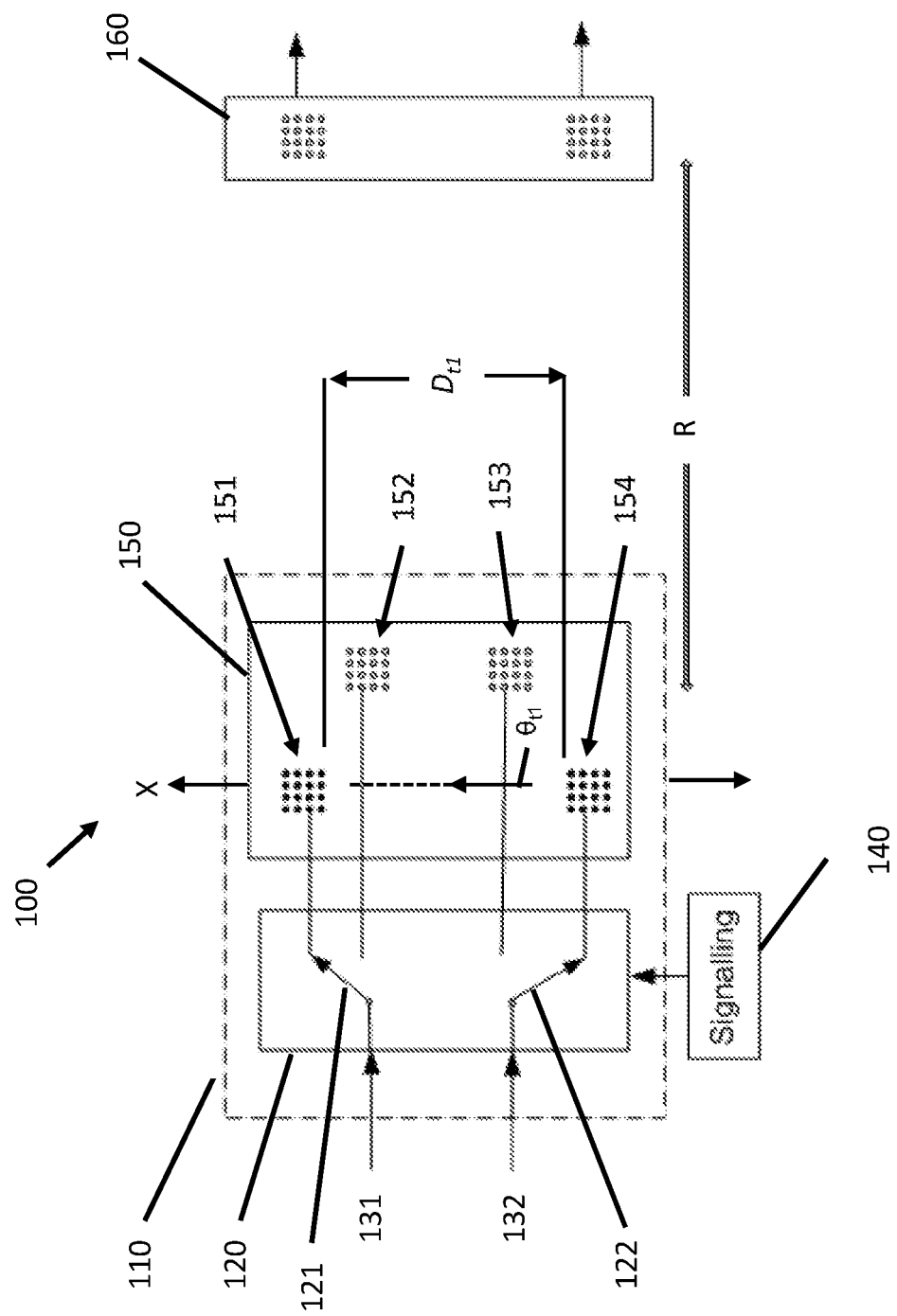
FIG. 2 is a block diagram of an exemplary antenna array configuration in a system incorporating aspects of the disclosed embodiments.
Figure 3:
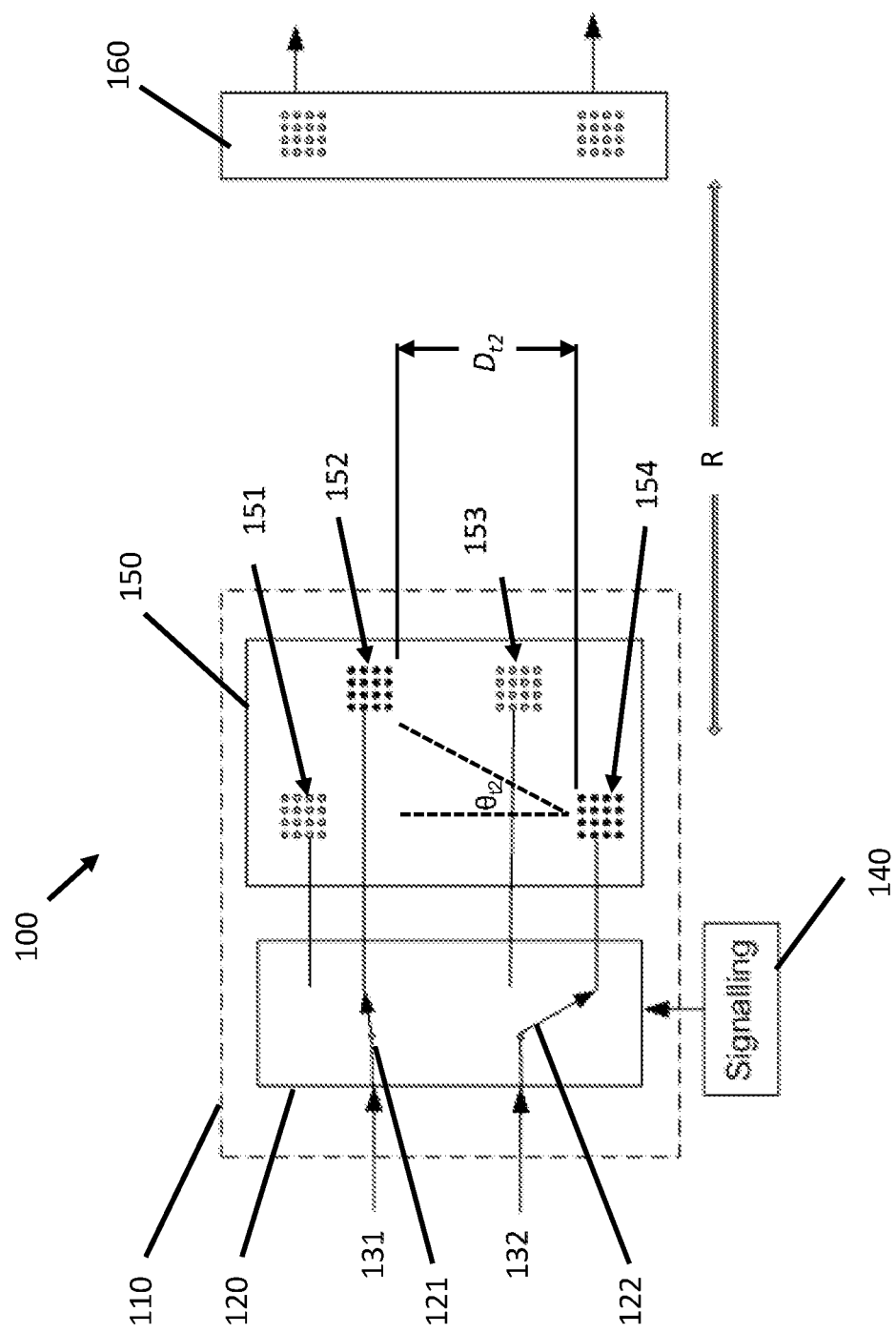
FIG. 3 is a block diagram of another exemplary antenna array configuration in a system incorporating aspects of the disclosed embodiments.

In general, when there are $M_t$ antenna sub-arrays 151-154, to select a particular combination of M sub-arrays, there are $$\frac{M_t!}{M!(M_t-M)!}$$

possible modes to choose from. A mode, as that term is used herein, generally refers to a particular connection arrangement between each of the input signals 131, 132 to respective ones of the antenna sub-arrays 151-154. Different modes of the antenna array 150 will have or provide different inter-distances $D_t$ between the different antenna sub-arrays 151-154 and/or down-tilting angles $\theta_t$. The tilting angle, whether down tilting or up tilting is generally the angle of inclination of the antenna or antenna array 150, as is determined by the connected ones of the antenna sub-arrays 151-154, relative to an axis, which in the examples of FIGS. 1, 2 and 3 is the axis X. If the inclination of the antenna is up or down, it is "up tilting" or "down tilting".

The term "!" here is a factorial calculator for integer M, M!=M*(M−1)*(M−2) . . . 3*2*1. As is understood, a factorial is a function that multiplies a number by every number below it. For example 6!=6*5*4*3*2*1=720. To indicate which mode is chosen, $$\log_2\left(\frac{M_t!}{M!(M_t-M)!}\right)$$

feedback bits, also referred to herein as control signalling information bits, are required. For example, if there are 8 modes, there is need for 3 bits as the feedback bits. As will be discussed further below, the number of feedback bits can be limited or equivalently a low number of configuration modes are required to maintain a high backhaul network capacity.

By changing the connection between the input signals 131, 132 to different ones of the antenna sub-arrays 151-154, different configurations of the antenna array 150 can be realized in terms of at least inter-distance $D_t$ between different ones of the antenna sub-arrays 151-154 and down-tilt angle $\theta_t$ of the antenna array 150. With different antenna configurations, the capacity of channel between the first network node 110, i.e. a transmitter, and the second network node 160, i.e. a receiver, can be modified and optimized.

In the example of FIG. 1, the controller 140 is configured to select an antenna configuration mode based on a determined channel capacity between the first network node 110 and the second network node 120. Based on the selected antenna configuration mode, the controller 140 controls the switching unit 120 to switch or change a connection of the input signals 131, 132 to different ones of the plurality of antenna sub-arrays 151-154. The selected antenna configuration mode will change one or more of an inter-distance $D_t$ between the respective ones of the plurality of antenna sub-arrays 151-154 and a down-tilting angle $\theta_t$ of the antenna array 150 to optimize the channel capacity between the first network node 110 and the second network node 160.

FIGS. 2 and 3 illustrate exemplary antenna configurations that can be realized in accordance with the aspects of the disclosed embodiments. In the example of FIGS. 2 and 3, switching device 120 includes two switches, switch 121 and 122. In alternate embodiments, the switch 120 can include any suitable number of switches other than including two.

In an embodiment when each input signal 131, 132 is only connected to one sub-array of the four possible sub-arrays 151-154 as is shown in FIGS. 2 and 3, the controller 140 has $$\frac{6!}{2!4!} = 6$$

antenna configuration modes from which to choose. The examples of FIGS. 2 and 3 show two modes of the six possible modes.

In the example of FIG. 2, switch 121 connects input signal 131 to antenna sub-array 151. Switch 122 connects input signal 132 to antenna sub-array 154. The inter-distance $D_t$ between antenna sub-array 151 and antenna sub-array 154 is shown as $D_{t1}$. The down-tilt angle $\theta_t$ of the configuration or mode shown in FIG. 2, $\theta_{t1}$, is 0.

In the example of FIG. 3, switch 121 connects input signal 131 to antenna sub-array 152, while switch 122 connects input signal 132 to antenna sub-array 154. The inter-distance between antenna sub-array 152 and antenna sub-array 154 is shown as $D_{t2}$. The down-tilt angle of the configuration or mode illustrated in FIG. 3 is non-zero, and is shown as $\theta_{t2}$.

Figure 5:
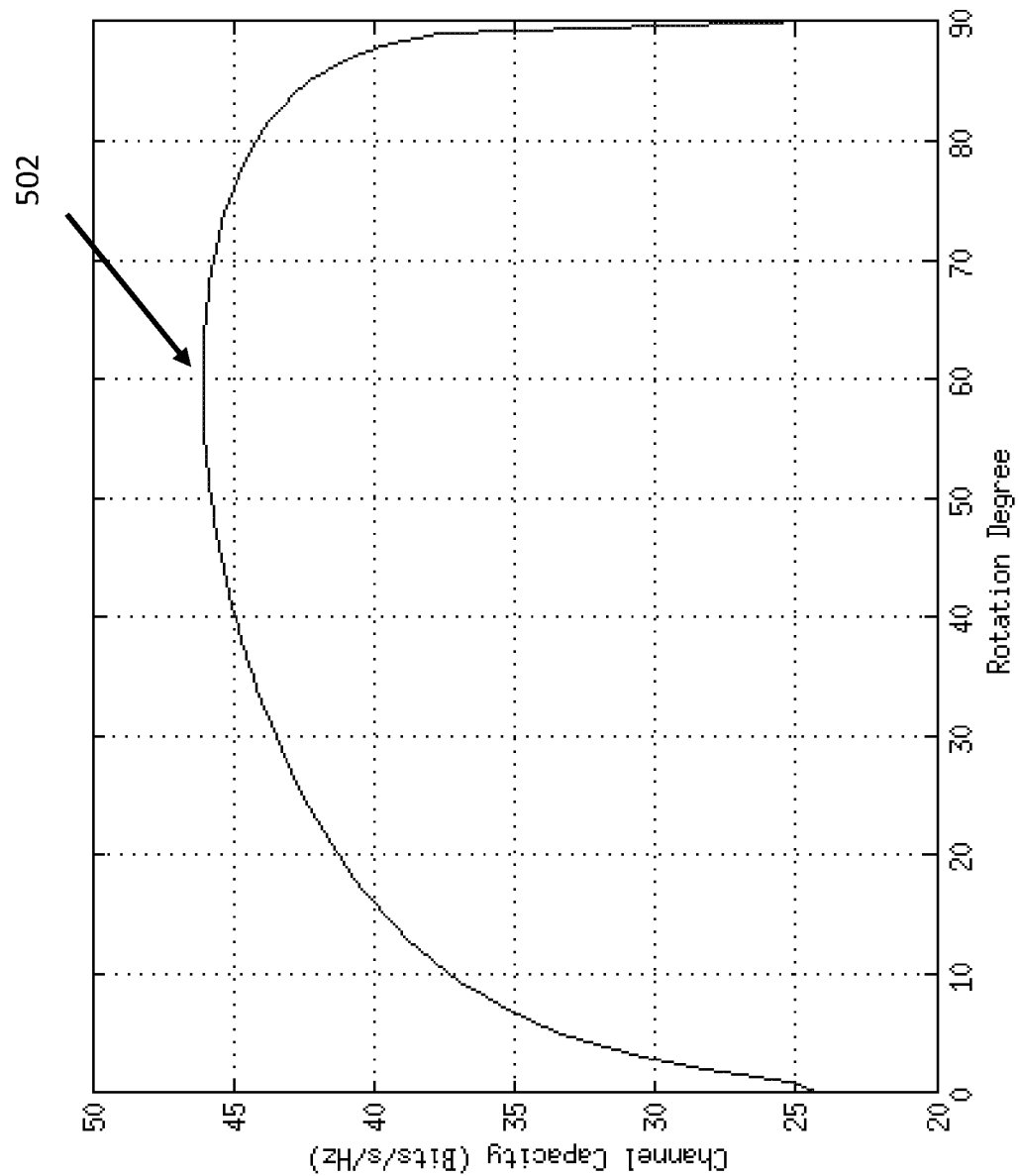
FIG. 5 illustrates the effect on channel capacity by changing the down tilting angle of an antenna array.

FIG. 5 illustrates the effect on the channel capacity of changing antenna down tilting angles, such as the down tilting angle $\theta_t$ of a transmitter and the down tilting angle $\theta_r$ of a receiver. In this specification, the terms "down tilting angle" and "up tilting angle" will have the same meaning as the term "rotation angle" and will be understood to have the same effect on the channel capacity. For example, an up-tilting angle of 60 degrees, and a down-tilting angle 60 degrees will have same effect on channel capacity. These are shown in FIG. 5 as rotation angle.

In this example, the graph in FIG. 5 is plotted as one antenna down tilting angle (e.g. $\theta_t$ or $\theta_r$) is zero, and channel capacity changes as another antenna down tilting angle (e.g. $\theta_r$ or $\theta_t$) changes. The starting point (rotation degree=0) is when the combination of the inter distance $D_t$, $D_r$ between the connected antenna sub-arrays 151-154 and the communication distance or range R between the first network node 110 and the second network node 160 provides a minimum channel capacity. As can be seen from the graph in FIG. 5, when the down tilting angle of one antenna rotates to approximately 60 degrees, the channel capacity is maximized.

As is shown in the graph of FIG. 5, for a large angle range, for example from about 20 degrees to about 85 degrees, the channel capacity is near optimal and within about 90% of the optimal value. This is shown in the example of FIG. 5 as the peak value 502, which occurs at the rotation degree angle of approximately 60 degrees. However, as is shown in the example of FIG. 5, there are severe capacity losses for angles of approximately 0 and 90 degrees.

The aspects of the disclosed embodiments address this issue by providing an antenna array 150 that is capable of re-configuring the connections between the input signals 131, 132 shown in FIG. 1 with different ones of the antenna sub-arrays 151-154. For example, three exemplary antenna configurations modes could include angles of for example 0, 50, 90 degrees. These angles, or others like them, are configured to maintain channel capacity at or close to the optimal channel capacity value and avoid the capacity loss that would typically be realized for an antenna system with a fixed antenna array configuration. In practical networks, that means that a limited number of antenna sub-array configurations can be used to achieve a close-to-optimal channel capacity.

The range of possible rotation angles is generally between 0 degrees and 90 degrees. If the rotation angle is tuned in terms of one step corresponding to one degree, there are 90 possible configuration modes. In the examples herein, this number of configuration modes would require $\log_2(90) \sim 10$ control signaling information bits. With a 10 degree tuning step, there are nine possible configuration modes that can be realized, which requires approximately four control signaling information bits. Thus, for larger steps or angle rotation increments, less control signaling information bits are required.

If a near-optimal channel capacity is targeted, such as for example 90% of peak channel capacity, only two control signaling information bits are needed. In this case the tuning degree is 90/4=22.5 degrees. In this example, an antenna tilting change of approximately 20 degrees is sufficient to transition the system from the worst case (for example lowest channel capacity with tilting angle (rotation angle) 0 degree and 90 degree) to a near optimal case. In this manner, the number of control signaling information bits can be kept low or at a minimum, such as two.

As described above, the number of control signaling information bits that are used can be reconfigured, depending on how close to the peak channel capacity it is desired for the system 100 to operate. However, the control signaling information bits, sent as signaling between the different nodes, can be a scarce system resource. The number of control signaling information bits that will be used needs to be decided based on trade-offs against system performance requirements and can be dynamically reconfigured based on system status.

Figure 6A:
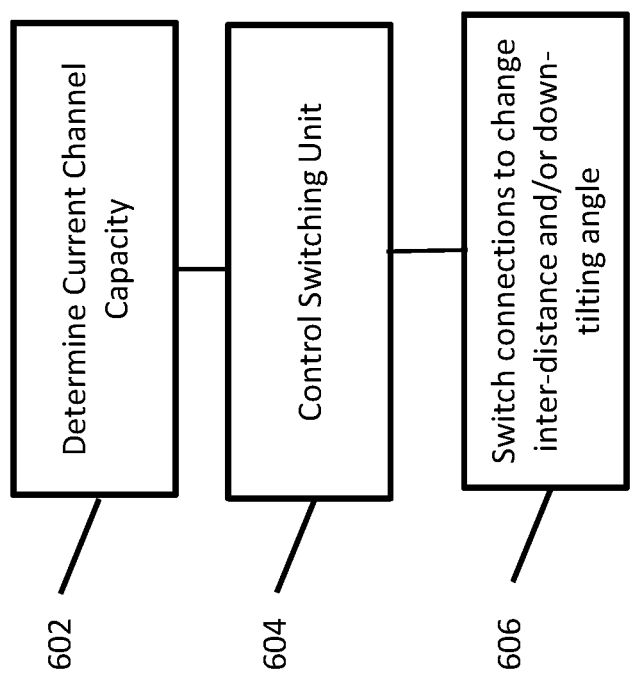
FIGS. 6A and 6B illustrates exemplary processes in a system incorporating aspects of the disclosed embodiments.
Figure 6B:
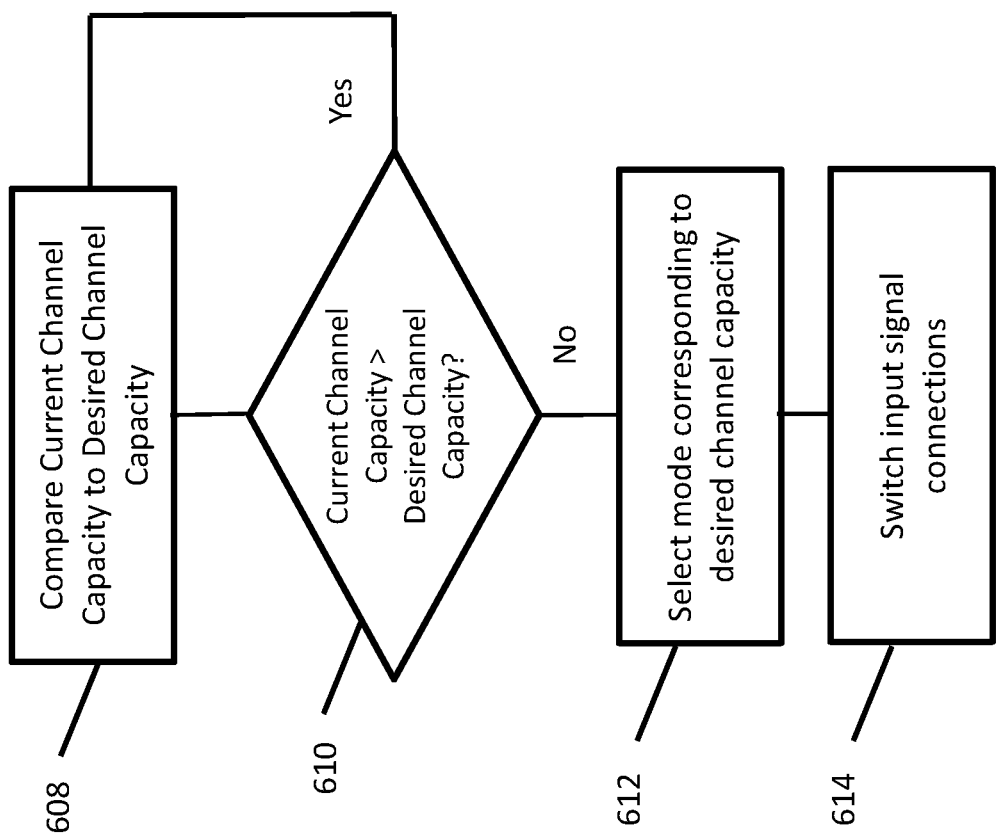

FIGS. 6A and 6B illustrate exemplary methods including aspects of the disclosed embodiments. Referring to FIG. 6A, in one embodiment, a channel capacity is determined at block 602. This can include determining a channel capacity between the first network node 110 and the second network node 160. The switching unit 120 is controlled at block 604 to switch at block 606 a connection of the at least two input signals 131, 132 to different ones of the plurality of antenna sub-arrays 151-154. In one embodiment, the switching at block 606 includes changing one or more of an inter-distance between the respective ones of the plurality of antenna sub-arrays 151-154 and a down-tilting angle of the antenna array 150.

In one embodiment, referring to FIG. 6B, the determined channel capacity, which generally represents the current channel capacity, is compared at block 608 to a desired channel capacity. It is determined at block 610 whether the current channel capacity is less than, or greater than, the desired channel capacity. If the current channel capacity is less than the desired channel capacity, or the desired channel capacity is greater than the current channel capacity, an antenna configuration mode is selected at block 612 that corresponds to the desired channel capacity. In one embodiment, the selected antenna configuration mode optimizes the channel capacity.

In one embodiment, the antenna configuration mode is selected from a database of antenna configuration modes where each antenna configuration mode corresponds to a channel capacity. In one embodiment, different antenna configuration modes can correspond to different tilting angles, which in turn impacts the channel capacity, as described above. Through the comparison between the current channel capacity and the desired channel capacity, a desired antenna tiling angle can be determined. In one embodiment, based on the consideration of a desired number of rotation steps, i.e. one degree, 10 degrees or 20 degrees, the number of control signaling information bits can be determined, and used to select the corresponding antenna configuration mode. The connections between the input signals 131, 132 are then switched at block 614 to respective ones of the antenna sub-arrays 151-154 that corresponds to the selected antenna configuration mode.

In one embodiment, the controller 140 receives control signaling information bits that will cause the controller 140 to select a specific antenna configuration mode. In the examples of FIGS. 1-3, the first network node 110 is configured to determine the channel capacity and send out the control signaling information bits to the controller 140. The controller 140 will then change the connections between the input signals 131, 132 and the antenna sub-arrays 151-154 to correspond to the desired or selected antenna configuration mode.

In one embodiment, the control signaling information bits are decided by the first network node 110 based on the direct or indirect measurement of the channel capacity between the first network node 110 and the second network node 160. The indirect measurements of the channel capacity may be determined by evaluating different parameters such as the signal-to-noise ratio (SNR), the signal-to-interference noise ratio (SINR), a rank of a selected channel, a range of the communication, or such other suitable parameter. In this example, the channel capacity measurement is done by the first network node 110. In alternate embodiments, the channel capacity measurements can be determined elsewhere, and the results can be sent from one node to another node, such as from the second network node 160 to the first network node 110.

In one embodiment, the communication range or distance between the transmitter and receiver, such as the distance R between the first network node 110 and the second network node 160 shown in FIG. 1, can be used to determine a specific antenna configuration mode for antenna array 150. Different distances R between the first network node 110 and the second network node 160 can require different rotation or tilt angles $\theta_t$ of the antenna array 150. The aspects of the disclosed embodiments can include determination of the communication distance R between the first network node 110 and the second network node 160 shown in FIG. 1.

The communication distance R between the first network node 110 and the second network node 160 can be determined or measured using any suitable method. Some examples of methods to determine the communication distance R can include, but are not limited to: 1) reading the distance R from an environment database that the network node 110 has access to; 2) calculating the distance R based on a geographical position of the first network node 110 and the second network node 120; 3) using a "laser range finder" or similar optical device that determines the distance, as is typically performed by an installation engineer; 4) using radar, wherein one of the first network node 110 or second network node 160 transmits a specific signal and receives the same signal reflecting back from the physical structure (shield of antenna, or a façade close to the antenna) associated with another node. The "reflected" signal can be also generated, regenerated or amplified by another node after the another node receives the specific signal sent by the first network node 110 or the second network 160. The communication distance R in this example is calculated by the determining the speed with which the signal travels and the latency between the reception and the transmission of the specific signal. Certain extra latency needs to be considered if the "reflected" signal is generated or regenerated by another node instead of the direct reflection from the physical structure, but this extra latency can be a known value from the node design. The above list is merely exemplary, and in alternative embodiments, any suitable method or methods can be used to achieve optimal results depending on the communication environment and performance-cost tradeoff.

Figure 4:
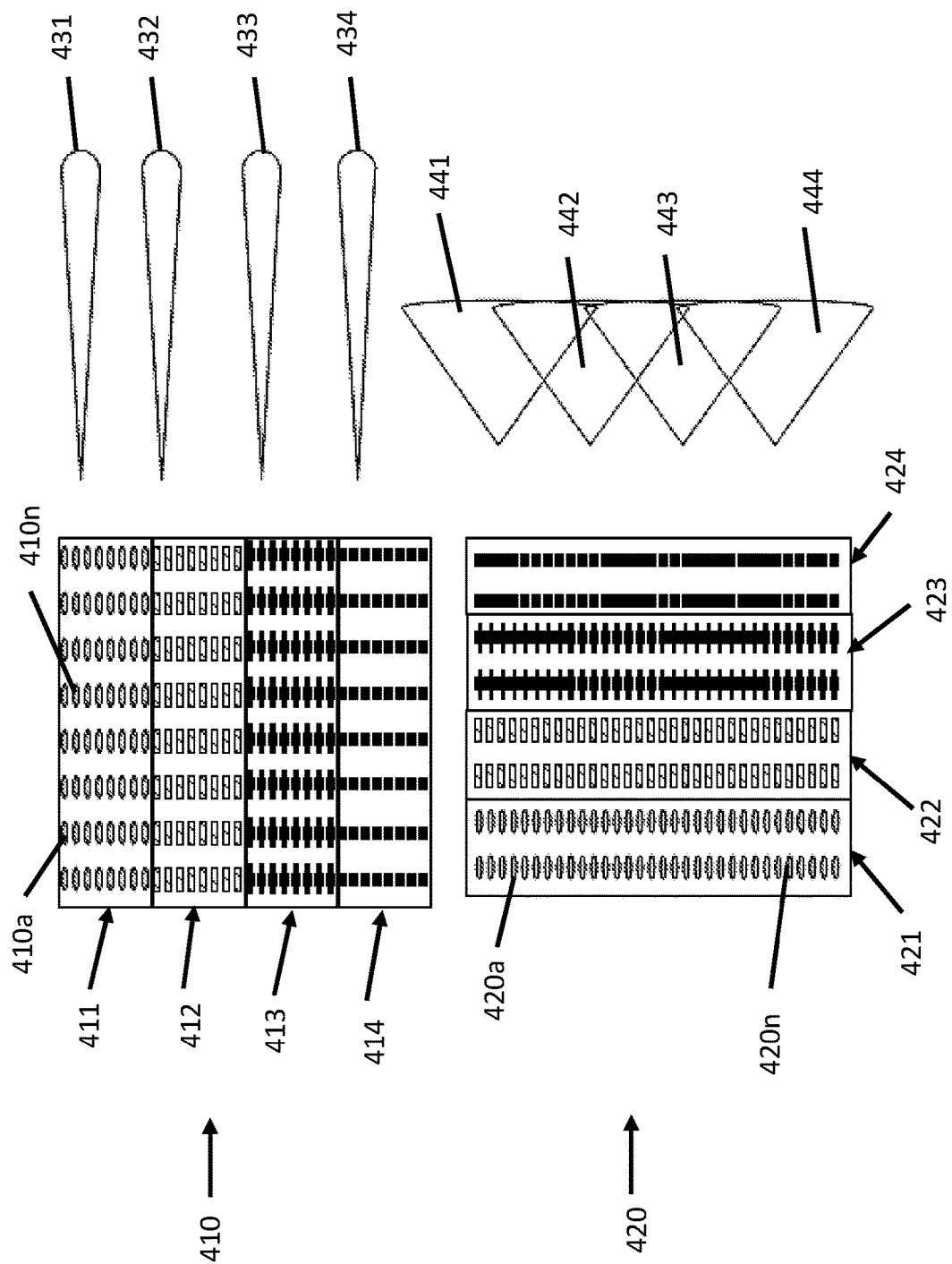
FIG. 4 is a block diagram of an exemplary antenna array configuration in a system incorporating aspects of the disclosed embodiments.

FIG. 4 illustrates another example of configuring an antenna incorporating aspects of the disclosed embodiments. In this example, two exemplary antennas 410 and 420 are shown. The antennas 410, 420 each include a plurality of individual antenna elements. For the purposes of the description herein, the plurality of all of the antenna elements in antenna 410 are generally referred to as antenna elements 410a-410n, while the plurality of all of the antenna elements in antenna 420 are generally referred to as antenna elements 420a-420n. The aspects of the disclosed embodiments are not limited by the particular reference number designation or the number of individual elements 410a-410n and 420a-420n shown in FIG. 4. It will be understood that an antenna sub-array, such as sub-arrays 411, 412, 413, 414 and 421, 422, 423, 424 can include any suitable number of antenna elements 410a-410n and 420a-420n, depending upon the size and configuration of the respective antenna sub-array.

In the example of FIG. 4, the antenna elements 410a-410n of antenna 410 are arranged or connected in groups, forming antenna sub-arrays 411, 412, 413 and 414. For antenna 420, the antenna sub-arrays are shown as 421, 422, 423 and 424. For the purposes of this description the shapes of the individual antenna elements 410a-410n and 420a-420n in the respective groups have been altered merely to make the different groupings or sub-arrays apparent. However, it will be understood that the physical shape of the individual antenna elements 410a-410n and 420a-420n are not necessarily different.

Referring to FIG. 4, in one embodiment, the configuration of the plurality of individual antenna elements, such as antenna elements 410a-410n within one antenna 410 can be adjusted to provide an intra antenna sub-array constellation within sub-arrays 411, 412, 413, 414 respectively as well as an inter antenna sub-array constellation between sub-array 411, 412, 413 and 414. The configuration of the plurality of individual antenna elements 420a-420n within antenna 420 can be adjusted to provide an intra antenna sub-array constellation within sub-arrays 421, 422, 423, 424 respectively as well as an inter antenna sub-array constellation between sub-arrays 421, 422, 423 and 424.

In a manner similar to that described with respect to the embodiments of FIGS. 1-3, the connections between the input signals 131, 132 to different ones of the individual antenna sub-array 411-414 of the antenna 410 can be switched to change the channel capacity between the transmitter and the receiver, or the first network node 110 and the second network node 160, in this example.

As is shown in FIG. 4, for antenna 410 the antenna elements 410a-410n are arranged in a first antenna sub-array 411 to form beam pattern 431; a second antenna sub-array 412 to form beam pattern 432; a third antenna sub-array 413 to form beam pattern 433 and a fourth antenna sub-array 414 to form beam pattern 434. For antenna 420, the antenna elements 420a-420n are arranged in a first antenna sub-array 421 to form beam pattern 441; a second antenna sub-array 422 to form beam pattern 442; a third antenna sub-array 423 to form beam pattern 443 and a fourth antenna sub-array 424 to form beam pattern 444. The particular arrangement and shapes of the antenna sub-array 411-414 and 421-424 in the example of FIG. 4 is merely exemplary, and in alternate embodiments the antenna elements 410a-410n and 420a-420n can be arranged in any suitable groups to optimize channel capacity as is generally described herein.

The configurations of antenna 410, 420 include the combination of the different intra antenna sub-array constellations and the inter antenna sub-array constellation. The particular shapes of the beam patterns produced in FIG. 4 are merely exemplary, and the individual antenna elements 410a-410n and 420a-420n can be controlled to produce any suitable beam pattern.

Although only two antennas 410, 420 are shown in the example of FIG. 4, the aspects of the disclosed embodiments are not so limited. In alternate embodiments, the number of antenna sub-arrays 411,412,413,414 and 421,422,423,424 can be any suitable number. Similarly, the number of individual antenna elements 410a-410n and 420a-420n is not limited by the number shown in the example of FIG. 4. The different antennas 410, 420 can include any suitable number of individual antenna elements 410a-410n and 420a-420n. Additionally, while the antennas 410, 420 have a substantially rectangular shape or form, the aspects of the disclosed embodiments are not so limited. The geometric shape or form of a particular antenna array and antenna sub-array can be any suitable form, such as square, triangular or circular, for example.

In the example of FIG. 4, the modification of the beam patterns 430, 440 is performed by changing the connection of input signals 131, 132 to specific ones of the antenna sub-arrays 411-414 and 421-424 as is generally described herein. Such a flexible antenna element configuration can be used to impact beam-forming in a way that the beam form shaped by one or more of the antenna sub-arrays 411-414, 421-424 is changed and the constellation of the respective antenna 410, 420 is changed. This can include for example changing from vertically placed antenna sub-arrays 411-414 into horizontally placed antenna sub-arrays 421-424. Also the number of antenna elements 410a-410n within one antenna sub-array 411-414, 421-424 and the number of antenna sub-arrays 411-414, 421-424 can be changed.

Figure 7:
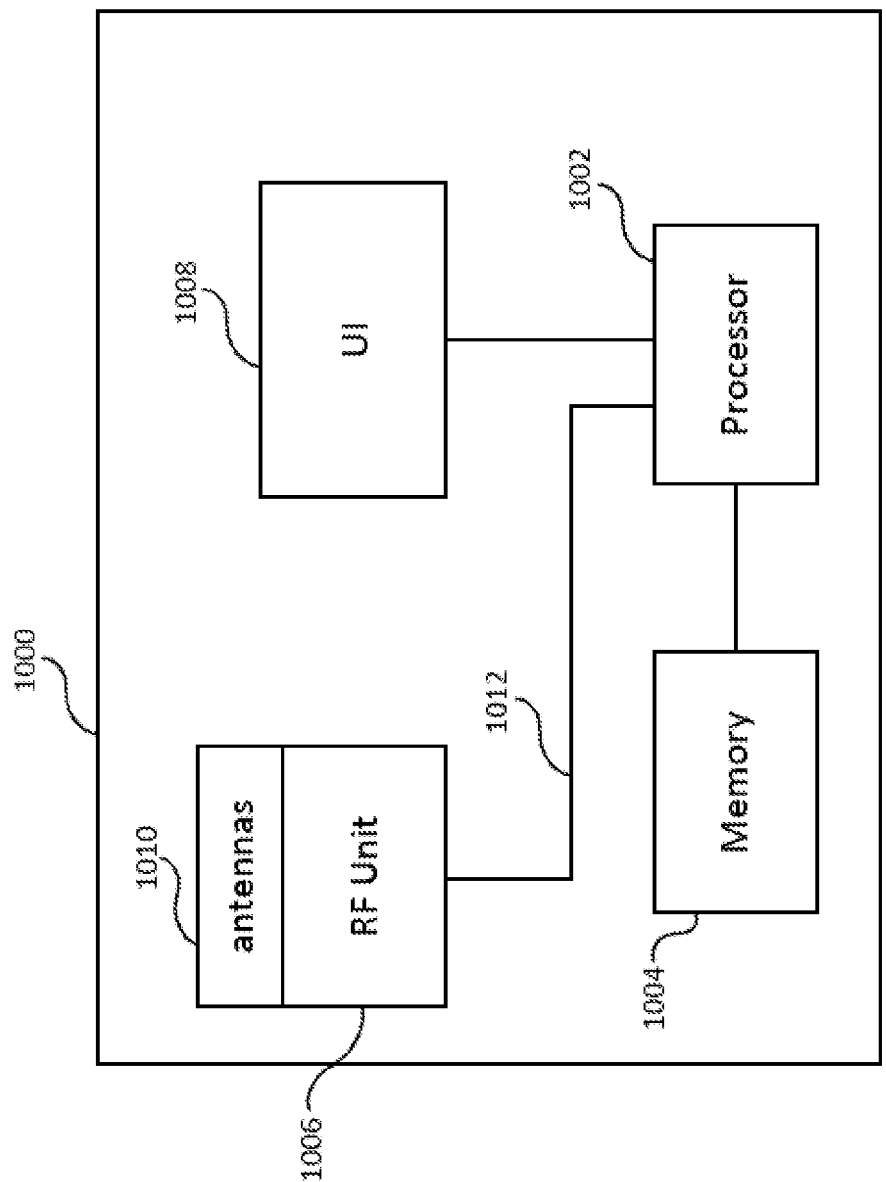
FIG. 7 is a block diagram of an exemplary apparatus that can be used to practice aspects of the disclosed embodiments.

FIG. 7 illustrates a block diagram of an apparatus 1000 that can be used to practice aspects of the present disclosure. The apparatus 1000 is appropriate for implementing embodiments of the network nodes and antenna switching apparatus and methods described herein. Individual ones of the apparatus 1000 as described herein can be implemented in one or more of the first access node 110 and second access node 160.

The apparatus 1000 generally includes a processor 1002 coupled to a memory 1004, and a radio frequency (RF) unit 1006, also referred to herein as a transceiver. In one embodiment, the RF unit 1006 can include one or more antennas 1010, such as the antenna array 150 described herein.

The apparatus 1000 can also include a user interface (UI) 1008. The apparatus 1000 may be a node in a wireless communication system and used as a transmitter and/or receiver, such as in a base station. It may be desirable when using the apparatus 1000 as a base station to remove the UI 1008 and administer the apparatus 1000 remotely via a network or other type of computer interface (not shown).

The processor 1002 may be a single processing device or may comprise a plurality of processing devices including special purpose devices, such as for example digital signal processing (DSP) devices, microprocessors, or other specialized processing devices as well as one or more general purpose computer processors including parallel processors or multi-core processors. The processor 1002 is configured to perform embodiments of the processes described herein.

The processor 1002 is coupled to a memory 1004 which may be a combination of various types of volatile and/or non-volatile computer memory such as for example read only memory (ROM), random access memory (RAM), magnetic or optical disk, or other types of computer memory. The memory 1004 stores computer program instructions that may be accessed and executed by the processor 1002 to cause the processor 1002 to perform a variety of desirable computer implemented processes or methods as are described herein. The program instructions stored in memory 1004 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 1004 are program data and data files which may be accessed, stored, and processed by the computer program instructions.

The RF Unit 1006 is coupled to the processor 1002 and configured to transmit and receive RF signals based on digital data 1013 exchanged with the processor 1002. The RF Unit 1006 is configured to transmit and receive radio signals that may conform to one or more of the wireless communication standards in use today, such as for example LTE, LTE-A, Wi-Fi, or may be configured for future radio access techniques. The RF Unit 1006 may receive radio signals from one or more antennas, down-convert the received RF signal, perform appropriate filtering and other signal conditioning operations, then convert the resulting baseband signal to a digital signal by sampling with an analog to digital converter. The digitized baseband signal also referred to herein as a digital communication signal 1013 is then sent to the processor 1002. In transmitter applications, the RF Unit 1006 is configured to receive digital information in the form of digital data 1013 from the processor 1002 and transmit it to one or more receivers such as mobile devices or UE.

In an embodiment of an apparatus 1000 that includes a UI 1008, the UI 1008 may include one or more user interface elements such as a touch screen, keypad, buttons, voice command processor, as well as other elements adapted for exchanging information with a user.

The aspects of the disclosed embodiments utilize a switching based configuration and reconfiguration of antenna sub-arrays, at either the transmitter or receiver, to improve and/or optimize a capacity of a channel between the transmitter and the receiver. By improving or pushing the channel capacity to near optimal values, higher data rates for communication between the transmitter and receiver are supported. In comparison with the more common mechanical tuning methods, the switching based antenna sub-array configuration of the disclosed embodiments can react faster, depending upon the control signal, making it suitable for transmitter and receiver antenna configurations in rapidly changing communication scenarios.

While the aspects of the disclosed embodiments are generally referred to herein as being applicable to the millimeter wave band, the aspects of the disclosed embodiments are not so limited. The aspects of the disclosed embodiments can be used in any suitable frequency band, such as a frequency band that is lower than the millimeter wave band, for example 10 GHz or even 6 GHz band. While the resulting size of the antenna array 150 or the size of physical entity containing the antenna array for such a lower frequency band may be larger than that for the case of the millimeter wave band, the aspects of the disclosed embodiments can be applied with the same principles.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A network node, comprising:
   an antenna array having a plurality of antenna sub-arrays;
   a switching device coupled to the antenna array, the switching device being configured to connect at least two input signals to respective ones of the plurality of antenna sub-arrays corresponding to a selected antenna configuration mode; and
   a processor configured to determine a channel capacity, wherein based on the channel capacity, the processor is configured to:
   receive a desired channel capacity of the antenna array;
   compare the determined channel capacity with the desired channel capacity of the antenna array;
   select an antenna configuration mode corresponding to the determined channel capacity that is larger than the desired channel capacity;
   control the switching device to switch a connection of the at least two input signals to different ones of the plurality of antenna sub-arrays corresponding to the selected antenna configuration mode that corresponds to the determined channel capacity that is larger than the desired channel capacity, to change one or more of an inter-distance between the respective ones of the plurality of antenna sub-arrays and a down-tilting angle of the antenna array.

2. The network node according to claim 1, wherein the processor is configured to determine the channel capacity between the network node and another network node.

3. The network node according to claim 2, wherein the processor is configured to determine the desired channel capacity by measuring a distance between the network node and the other network node and decide the antenna configuration mode.

4. The network node according to claim 1, wherein the processor is configured to determine the channel capacity based on one or more of a signal-to-noise ratio (SNR), a signal-to-interference noise ratio (SINR), a rank of a channel or a range between the network node and the another network node, or a carrier frequency.

5. The network node according to claim 1, wherein processor is configured to signal the switching device to switch the connection of the at least two input signals to different ones of the plurality of antenna sub-arrays corresponding to the selected antenna configuration mode that corresponds to the determined channel capacity that is larger than the desired channel capacity using a quantized bit mapping, wherein each quantized bit mapping represents a different antenna configuration mode.

6. The network node according to claim 1, wherein an antenna configuration mode comprises a connection of at least one first input to at least one of the plurality of antenna sub-arrays and a coupling of at least one second input to at least one other one of the plurality of antenna sub-arrays.

7. The network node according to claim 1, wherein each of the plurality of antenna sub-arrays comprises a plurality of antenna elements, and wherein the processor is configured to cause the switching device to connect the at least two input signals to a respective ones of the plurality of antenna elements corresponding to the selected antenna configuration mode that corresponds to the determined channel capacity that is larger than the desired channel capacity.

8. The network node according to claim 7, wherein the processor is configured to connect the at least two input signals to the respective ones of the plurality of antenna elements corresponding to the selected antenna configuration mode that corresponds to the determined channel capacity that is larger than the desired channel capacity, to change an inter-distance of one antenna element relative to another antenna element in an antenna sub-array.

9. The network node according to claim 7, wherein the processor is configured to signal the switching device to connect the at least two input signals to an at least one antenna element of the plurality of antenna elements to form at least one antenna sub-array corresponding to the selected antenna configuration mode that corresponds to the determined channel capacity that is larger than the desired channel capacity.

10. A method performed by a network node, comprising:
    determining a channel capacity;
    receive a desired channel capacity of an antenna array;
    compare the determined channel capacity with the desired channel capacity of the antenna array;

select an antenna configuration mode corresponding to the determined channel capacity that is larger than the desired channel capacity; and controlling a switching device to switch a connection of at least two input signals to different ones of a plurality of antenna-subarrays of an antenna array corresponding to the selected antenna configuration mode, to change one or more of an inter-distance between respective ones of the plurality of antenna sub-arrays and a down-tilting angle of the antenna array.

11. The method according to claim 10, wherein determining the channel capacity comprises determining the channel capacity between the network node and another network node.

12. The method according to claim 11, comprising:
determining the channel capacity based on one or more of a signal-to-noise ratio (SNR), a signal-to-interference noise ratio (SINR), a rank of a channel or a range between the network node and the another network node, or a carrier frequency.

* * * * *